United States Patent
Boudry et al.

(10) Patent No.: US 7,490,861 B2
(45) Date of Patent: Feb. 17, 2009

(54) COUPLINGS

(75) Inventors: John Alexandre Boudry, Brettenham (GB); Christopher Richard Wise, Pinebrook (GB)

(73) Assignee: Petro Technik, Ltd., Ipswich Suffolk (GB)

( * ) Notice: Subject to any disclaimer, the term of this patent is extended or adjusted under 35 U.S.C. 154(b) by 189 days.

(21) Appl. No.: 10/491,507

(22) PCT Filed: Oct. 4, 2002

(86) PCT No.: PCT/GB02/04504

§ 371 (c)(1),
(2), (4) Date: Nov. 12, 2004

(87) PCT Pub. No.: WO03/029717

PCT Pub. Date: Apr. 10, 2003

(65) Prior Publication Data

US 2005/0073145 A1 Apr. 7, 2005

(30) Foreign Application Priority Data

Oct. 4, 2001 (GB) .................................. 0123845.0

(51) Int. Cl.
*F16L 13/02* (2006.01)
*F16L 35/00* (2006.01)

(52) U.S. Cl. .................. 285/21.2; 285/21.1; 285/123.1; 285/285.1; 285/361; 285/402; 219/535; 219/544; 156/273.92; 156/274.2

(58) Field of Classification Search ............... 285/21.1, 285/123.1, 123.15, 285.1, 123.16, 123.3, 285/361, 396, 402, 90, 91, 404; 219/535, 219/544; 156/273.9, 274.2, 379.7
See application file for complete search history.

(56) References Cited

U.S. PATENT DOCUMENTS 4,626,308 A * 12/1986 Ansell .................. 156/257
4,708,370 A * 11/1987 Todd ..................... 285/12

(Continued)

FOREIGN PATENT DOCUMENTS

GB 2 298014 8/1996

(Continued)

*Primary Examiner*—James M Hewitt
*Assistant Examiner*—Jay R Ripley
(74) *Attorney, Agent, or Firm*—Stetina Brunda Garred & Brucker (57) ABSTRACT

An electrofusion coupling for joining together two or more sections of pipe or for joining a section of pipe and a pipework fitting, said coupling comprising: (i) a first part (14) having a first internal diameter at a first end adapted to form a tight sliding fit with a first pipe section and a second internal diameter at a second end, larger than the first; (ii) a second part (14) having a first internal diameter at a first end adapted to form a tight sliding fit with a second pipe section and an outside diameter at a second end adapted to form a tight sliding fit with the second internal diameter of the first part such that the two parts can nest together tightly with an overlapping region; (iii) electrical heating elements (16, 17, 18) and electrical terminal connections being provided in the two parts such that the first part can be used independently of the second part to join a section of pipe to a pipework fitting or the first and second parts can be used in combination to join two adjacent sections of pipe.

16 Claims, 10 Drawing Sheets

U.S. PATENT DOCUMENTS

| | | | |
|---|---|---|---|
| 5,529,656 A | 6/1996 | Ewen et al. | |
| 5,685,572 A * | 11/1997 | Linton et al. | 285/21.2 |
| 6,237,640 B1 * | 5/2001 | Vanderlee | 138/99 |
| 6,394,502 B1 | 5/2002 | Andersson | |

FOREIGN PATENT DOCUMENTS

| | | |
|---|---|---|
| GB | 2 318 543 A | 4/1998 |
| GB | 2 324 132 A | 10/1998 |
| GB | 2 349 927 A | 11/2000 |
| GB | 2 355 775 A | 5/2001 |
| JP | 5240394 | 9/1993 |
| JP | 7198086 | 8/1995 |
| JP | 8042774 | 2/1996 |
| JP | 8145268 | 6/1996 |
| WO | WO 99/46532 | 9/1999 |
| WO | WO 9946532 A1 * | 9/1999 |
| WO | WO 01/20219 | 3/2001 |

\* cited by examiner

COUPLINGS

FIELD OF THE INVENTION

The present invention relates to a method and apparatus for joining together lengths of pipe. It is particularly applicable, but in no way limited, to a method and apparatus for joining together lengths of secondarily contained plastic pipe, including elbows and other junctions.

BACKGROUND TO THE INVENTION

Pipes made of plastics material are used extensively in industry and in construction. Many applications now use pipes made from plastics materials such as polyethylene and polypropylene rather than metal. One such application is the pipework used in petroleum installations such as garage forecourts.

In the design of petroleum forecourt installations for example, it is regarded as increasingly important to contain and detect any leaks of petroleum or diesel fuel from subterranean pipes which connect one or more storage tanks to dispensing pumps in the installation. To that end, many current designs of forecourt installation utilise secondary containment. This involves containing each supply pipeline in a respective secondary containment pipeline which is optionally sealed at its ends to the fuel supply pipelines. The secondary containment pipeline prevents leaks from the fuel supply pipeline from being discharged into the environment, and also can convey leaked petrol to a remote sensing device.

Whilst every effort is made to avoid having joints in an underground supply pipeline, other than inside manhole chambers, these joints sometimes cannot be avoided. Such joints are conventionally made using special fittings and the connections are made using a chemical-based jointing compound or by electrofusion welding. The latter technique is preferred in many applications.

In conventional single containment plastic piping systems, successive lengths of plastic pipe are joined end to end using so-called electrofusion couplings or welding muffs, which typically comprise short plastic sleeves providing sockets at either end having internal diameters of a size to receive the ends of the respective pipes as a close fit and incorporating electrical resistance heating windings. Thus two adjoining pipe lengths can be connected end to end by inserting the adjoining pipe ends into such an electrofusion coupler from opposite ends thereafter passing electric current through the heating windings in order to fuse the internal surfaces of the electrofusion coupling and the adjoining the external surfaces of the inserted pipe ends, thereby welding the pipe ends to the electrofusion coupling to form a fluid tight joint.

Hitherto, in constructing secondary containment pipeline systems utilising plastic pipes, the pipe lengths forming the inner plastic pipe have been connected end to end by a first series of electrofusion couplings, whilst the pipe lengths forming the outer pipe have been connected end to end by a second series of electrofusion couplings distinct from and separate from those connecting the lengths of inner pipe. This procedure inevitably involves threading the outer pipe and the electrofusion couplings for the outer pipes over the inner pipes and/or the longitudinal displacement of the outer pipes and the associated electrofusion couplings relative to the inner pipes. This involves substantially more labour than the construction of a comparable single containment pipe system by similar techniques. In addition, it is normal practice to complete the primary pipework and test its integrity prior to completing the secondary containment system. This inevitably means multiple handling for the couplings. For example, couplings for the secondary pipes have to be slid into position in advance then moved aside as necessary. Alternatively, sections of secondary pipe and the associated couplings have to be fed over the length of the primary pipe once it has been assembled, welded and tested. This is both time consuming and labour intensive.

Matters are further complicated if a joint is being formed in the latest composite primary/secondary pipe. In this type of pipe, an example of which is described in GB9824955.6 and PCT/GB98/03422 (PetroTechnik Ltd), the primary and secondary pipe are formed as one. Conventional welding sockets cannot be used at all to weld this type of pipe because there is insufficient space between primary and secondary pipes to accommodate the inevitable terminal pins on the welding socket used on the primary pipe. Furthermore, the elbows and Tee-junctions for this type of pipe have to have a different, larger diameter than the pipe itself. This is because couplings for the primary pipe-to-primary elbow connection have to be accommodated within the secondary pipe-to-outer elbow connection. This requires a wide range of couplings to be made where the opposing diameters of items to be joined differ according to the intended use.

Accordingly, it is an object of the present invention to overcome or at least mitigate one or more of the problems outlined above.

SUMMARY OF THE INVENTION

According to the present invention there is provided an electrofusion coupling for joining together two or more pipework components, said coupling comprising:

(i) a first part having a first internal diameter at a first end adapted to form a tight sliding fit with a first pipe section and a second internal diameter at a second end, larger in diameter than the first and of substantially uniform cross-section;

(ii) a second part having a first internal diameter at a first end adapted to form a tight sliding fit with a second pipe section and an outside diameter at a second end adapted to form a tight sliding fit with the second internal diameter of the first part such that the two parts can nest together tightly with an overlapping region;

(iii) electrical heating elements and electrical terminal connections being provided in the two parts such that the first part can be used independently of the second part to join a section of pipe to a pipe or pipework fitting or the first and second parts can be used in combination to join two adjacent sections of pipe. This arrangement provides, for the first time, a coupling which can be used to join together two pipes or pipework components of the same diameter or two pipework components of different diameter by using either both parts of the coupling or only one part.

Preferably the second internal diameter of the first part is adapted to be a tight sliding fit over a pipe connector such as an elbow or a Tee fitting, and the electrical heating element associated with the overlapping region is located at or near the surface of the second internal diameter of the first part.

In a particularly preferred embodiment an electrical connection is provided which establishes an electrical connection between the winding in the two parts of the coupling when the two parts are nested together.

Preferably a locking mechanism is provided adapted to lock the two parts together in the nested configuration.

Preferably the locking mechanism also provides for electrical contact between the electrical heating elements in the two parts of the coupling.

BRIEF DESCRIPTION OF THE DRAWINGS

The invention will now be described by way of example only with reference to the accompanying drawings wherein:

FIG. 13A' is a front view of the second fining shown in FIG. 13A;

DETAILED DESCRIPTION OF THE PREFERRED EMBODIMENTS

The embodiments of the present invention will now be described by way of example only. They are currently the best ways known to the applicant of putting the invention into practice but they are not the only ways in which this can be achieved.

Figure 1:
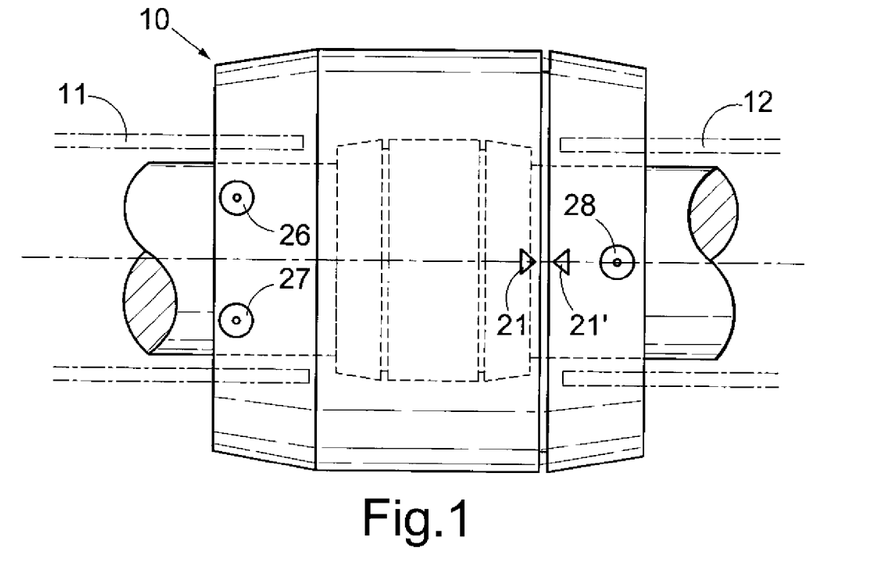
FIG. 1 illustrates a plan view of a coupling for a secondary pipe with a primary pipe coupling housed within in shown in outline.
Figure 2:
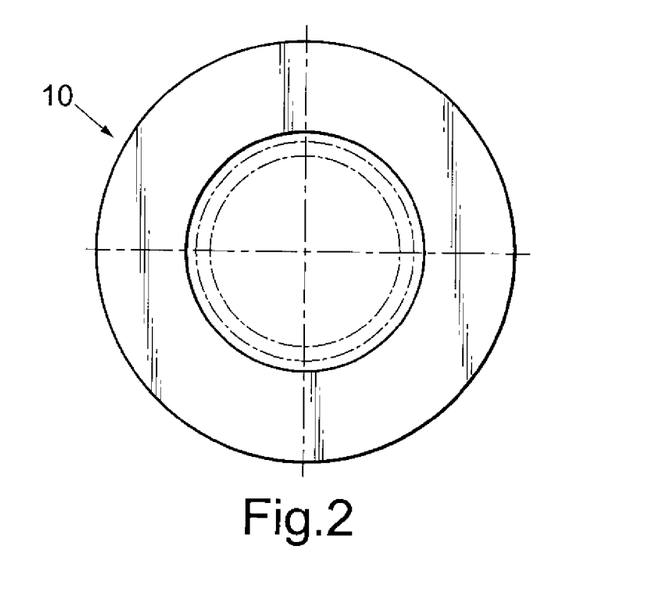
FIG. 2 shows an end view of the coupling in FIG. 1.
Figure 3:
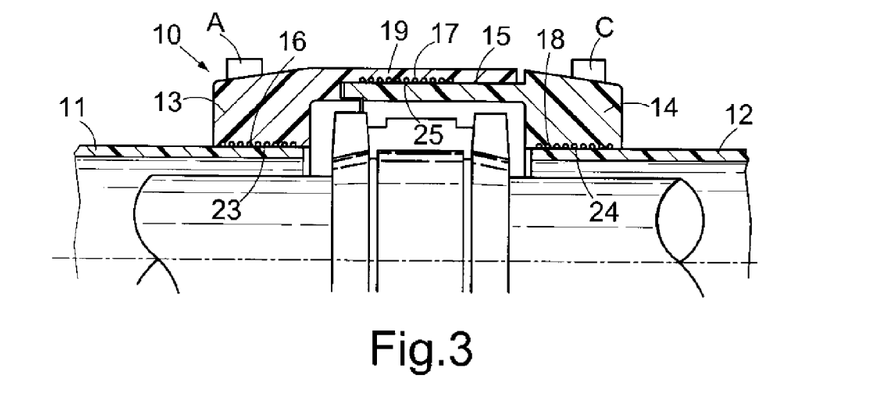
FIG. 3 illustrates a cross sectional view of the secondary coupling in FIG. 1.

Referring to FIGS. 1 and 3 these show a coupling 10 for forming an electrofusion weld between two adjacent sections of secondary pipe 11, 12 or between a section of secondary pipe and a secondary pipe fitting. The coupling is manufactured in two parts 13, 14, the two parts mating together closely in a central region 15 in this particular embodiment.

One of the novel features of this type of coupling is the special arrangement of electrofusion windings and that sets of electrofusion heating elements or windings are provided in each part. A first set of windings 16 are provided on the inner surface of part 13. This part has a first internal diameter 23 which is a tight sliding fit over the outside diameter of secondary pipe 11. The same part 13 also has a second internal diameter 25 which is a tight sliding fit over the external or outside diameter of part of the second part of the fitting 14. The windings 16 are located in the portion of part 13 which is designed to be a tight sliding fit over a secondary pipe. One end, a first end, of windings 16 is connected to electrical terminal pin A.

Figure 5:
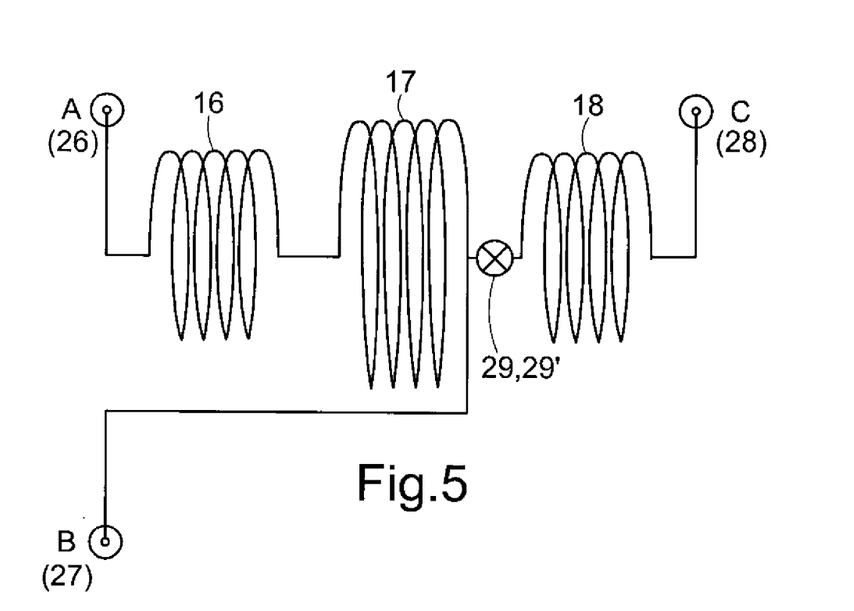
FIG. 5 illustrates in diagrammatic form the various electrical windings within the coupling.

The special arrangement of electrical windings is shown diagrammatically in more detail in FIG. 5. Windings 16 associated with surface 23 are connected at one end to terminal pin A, 26. The other end of this set of windings leads into one end of windings 17 associated with the surface 25. The other end of windings 17 is attached to terminal pin B, 27. Thus part 13 may be used as a stand alone coupling to form a joint between a piece of secondary pipe and a secondary elbow, Tee or other pipework component. In this mode, current is passed between terminals A and B, 26 and 27 using a conventional electrofusion welding machine.

Part 14, a second part of the fitting has a first internal diameter 24 at or near the first end of the fitting. This internal diameter is designed and adapted to be a tight sliding fit with the outside diameter of a section of secondary pipe. The outside diameter at or near the other, second end of the part 14 is adapted to form a tight sliding fit with the second internal diameter on the first part 13 such that the two parts can nest together with an overlapping region.

As with the first part 13, part 14 contains electrical windings 18 enabling it to be fused to secondary pipe 12. Electrical windings 18 are located on the inner surface of an internal diameter 24 which is a tight sliding fit over the outside diameter of secondary pipe 12. One end of windings 18 is connected to terminal pin C, 28. The other end of windings 18 is connected to connection means 29. When an electrical current is passed through windings 16, 17 and 18 it causes a fluid tight joint to be formed between regions of parts 13 and 14 and the secondary pipes 11 and 12 simultaneously. The sequence and options for passing current through the various windings will be described in detail below.

An important feature of the present invention is that the second internal diameter 25 of the first part of the fitting 13 is also a tight sliding fit onto a secondary elbow or Tee fitting.

This arrangement is shown diagrammatically in FIG. 4, and will be described in more detail below. When electrical current is passed through windings 16 and 17 in this configuration a fluid tight weld is formed between part 33 and a secondary pipe 31 in the region of 36 (by windings 16) and also between part 33 and the secondary elbow or Tee fitting 32 at region 37 (by windings 17) simultaneously.

In addition parts 13 and 14 are a tight mating fit with each other and the central set of windings 17 enable the two parts 13 and 14 to be fused together such that in the central region 15 the two parts become one.

However, there is a further electrical connection into windings 17 in part 13. This is a connection 29 which links windings 17 with windings 18 when the second part of the fitting 14 is inserted and locked home into the first part 13. This so-called locked configuration is shown in FIG. 3. Whilst one end of windings 18 is connected to connection 29, the other end is connected to terminal pin C, 28. In this locked configuration current can be passed between terminal pin A and terminal pin C, with no electrical connection being made to terminal pin B. Using terminal pins A and C simultaneous welds surface 23 to secondary pipe 11, the overlapping central region 15 becomes welded together, and surface 24 is welded to secondary pipe 12.

Methods of laying a heating wire into a surface are known, for example by Rutland Plastics (RTM) Ltd, and can be applied in this technology without substantial modification.

It will be appreciated that this arrangement has a number of advantages. First, during assembly, the coupling halves or parts can be fed easily onto the respective ends of the secondary pipes 11, 12. There is no need to thread the whole connector over long lengths of pipe. Secondly, and more importantly, the internal diameter of the central region 15 on the projecting end 19 of part 13 corresponds to that of the outside diameter of an elbow or Tee-junction. This is shown more clearly in FIG. 4. Therefore one coupling or connector can be used either as a whole to couple either two pieces of secondary pipe or in part to couple one piece of secondary pipe to an elbow or Tee as shown in FIG. 4.

It follows that one of the advantages of this design is that in the first option the two parts can be used in conjunction to fuse two parts or pipes of the same O/D (outside diameter) when using the two halves together or, in the second option, two parts of different O/D when using one half of the coupling only.

The two halves or parts 13, 14 are designed to mate and lock together. The locking arrangement is such that it makes it impossible to use the two halves together if not coupled properly in the right orientation. A number of locking arrangements are possible. For example the respective parts could include components of a bayonet-type fitting. The parts would need to be pushed and twisted together to make the alignment marks 21, 21¹ match up. An example of this type of coupling connection is shown in FIGS. 9 and 10, described in more detail below. Alternatively an internal tongue and groove arrangement could be provided or some other "lock and key" mechanism. This would ensure proper electrical connection between the windings on the two parts of the fitting by ensuring that connection 29 mates together to secure good electrical contact. Locking mechanisms for use in this type of arrangement are known per se to the materials specialist. Also the technology to form a good electrical contact between two mating parts is known to those skilled in the art. It is during the "locking" process that electrical contact in connector 29 occurs to ensure continuity of the welding element through the two halves, i.e. the contact can only be obtained in one position, the one and only correct one.

The profile of the locking arrangement is such that the two halves cannot separate horizontally or vertically during the welding operation which might otherwise result due to the extraordinary forces of the melting and expanding plastic.

In this example there are provided pointing/meeting arrows 21, 21¹ as alignment markers on top of both halves so that it should be self-explanatory to the user that the two arrows have to face each other in alignment for proper use.

As explained above, FIG. 4 illustrates schematically an arrangement in which a novel type of pipework consisting of a primary and a tight fitting secondary pipe surrounding it is connected to a Tee or an elbow joint whilst retaining an intact secondary containment system throughout the joint region.

Unfortunately, due to tooling restrictions fittings such as elbows and Tees need to be formed with the outer elbow or Tee being of a greater O/D than the secondary pipe.

In this type of arrangement the welding socket of the primary pipe will almost inevitably be thicker than the thickness of the secondary pipe and therefore it is necessary to step over the socket forming a joint between the two primary pipes.

It is thus a requirement to be able to weld pipes and pipework components of either similar or dissimilar O/Ds. This has not been possible hitherto with the same coupling fitting.

It is normal practice to complete the primary pipework and test its integrity prior to closing the secondary containment. When using the two halves 13, 14 together it is therefore possible to slide each half over the respective secondary pipe, close and finish welding the primary pipes together, prior to closing the two halves of the coupling together and finishing the secondary containment system.

In the arrangements described above a primary pipe 35 is encased within a secondary pipe 31. FIG. 4 illustrates a junction between a primary pipe and a primary Tee or elbow 34 and a secondary Tee or elbow 32. The two primary components 34 and 35 are joined using a low profile welding socket with removable contacts of the type described in GB 0022542.5 (see below), the entire text of which is incorporated herein by reference. It is intended that this text should form an integral part of this disclosure. A part of a welding socket 33, according to the present invention, which had previously been slid over the end of the secondary pipe is now moved across to cover the join in the primary components. This half-welding socket is used to join the secondary pipe 31 to the secondary elbow or Tee 32. This completes the integrity of the secondary containment system in that region.

Novel and compact secondary containment pipework systems have been described in GB 0118039.7, the entire text of which is incorporated herein by reference. It is intended that this earlier description forms an integral part of the present disclosure.

Figure 6:
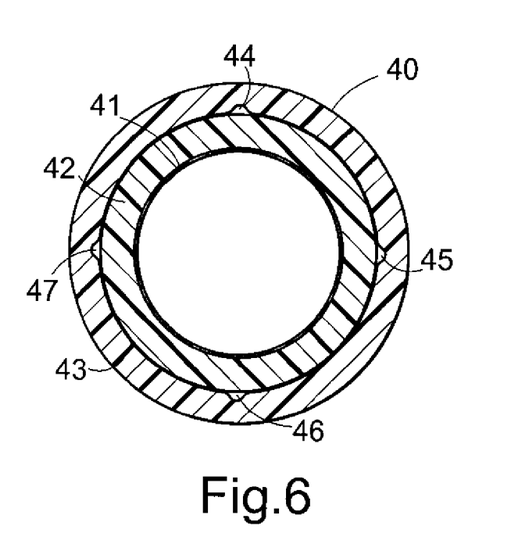
FIG. 6 illustrates one type of composite primary/secondary pipe.

FIG. 6 illustrates a cross-sectional view of such a pipe 40 consisting of an inner barrier layer 41, an inner supply pipe 42 and an outer secondary pipe 43. The inner barrier layer 41, which is optional, comprises a cylindrical skin or coating of nylon or a nylon derivative which is supported on the inner surface of the inner supply pipe 42. The supply pipe is typically constructed form polyethylene having a modulus in the range 100 to 4,000 MPa. Alternative construction materials are discussed below. The skin or coating 41 lines the central passage of the pipe 40 through which petrol/diesel is to be conveyed. The layer 41 is constructed from material which is substantially impervious to petrol and thus presents a barrier to the diffusion of petrol through the inner supply pipe. It is advantageous to have an inner barrier layer because a polyethylene pipe, although showing some resistance towards the diffusion of petrol, does exhibit some permeability thereto.

The inner supply pipe 42 is of conventional construction and takes the form of a regular thick-walled pipe of substantially uniform cross-section.

In prior art pipes there is usually a discreet air gap between the outer surface of the primary, inner supply pipe and the inner surface of the outer secondary pipe. As can be seen from FIG. 6, in this embodiment, there is no appreciable air gap. Any gap shown in FIG. 6 is purely for illustrative purposes only, to show that pipes 42 and 43 are separate entities and not bonded together. Rather the outer pipe fits tightly and snugly over the outside of the inner supply pipe. In this example the two pipes are not stuck or welded together for a number of reasons. Firstly, the pipe would be much more rigid if the inner pipe and the secondary pipe were stuck together. Improved flexibility, rather than rigidity, is a preferred feature because the complete pipe has to pass around tightly radiused bends during installation and replacement.

Secondly, the almost imperceptible gap between the two layers is permeable to fluid and forms an interstitial space between the two pipes to enable monitoring and testing to take place. This interstitial space is infinitesimally thin and difficult to measure. Nonetheless it is fluid permeable.

This interstitial space is supplemented by one or more grooves 44, 45, 46, 47 or channels formed in the inner-surface of the outer secondary pipe. These grooves or channels run the length of the pipe. They may be substantially straight, following the longitudinal axis of the pipe, or they may be spiral, helicoidal or otherwise curvilinear.

The number, shape and configuration of these grooves is variable within certain limits. One groove around the circumference may be sufficient but more normally three or four grooves are formed, spaced equally around the inner circumference of the secondary pipe. A groove with a gently radiused profile, as shown in FIG. 6, is preferred since this limits any weakness in the secondary pipe which results from the presence of grooves.

It will be appreciated that with the exception of the grooved region(s), the inner surface of the secondary pipe follows substantially exactly the contour of the inner supply pipe. The two pipes are thus as one, and as such, this arrangement could be considered unitary construction.

In the example where a pipe of 110 mm diameter is intended for petroleum applications, then the thickness of the wall of the supply pipe is typically in the order of 7 mm. Of this the inner nylon layer can be from 0.01 mm to 6.99 mm. Conversely, the outer polyethylene layer could be of a thickness of 0.01 to 6.99 mm.

Pipe of this type can be used to carry a wide variety of fluids, which term includes both gases, liquids and vapours. This technology is applicable to pipework systems suitable for conveying a wide variety of fluids. For example, it could be used for water mains or other aqueous streams, gases including natural gas, solvents, including hydrocarbons and petroleum, which has a very broad meaning in this context. It includes petrol, diesel, fuel oil, aviation fuel and LPG.

Figure 4:
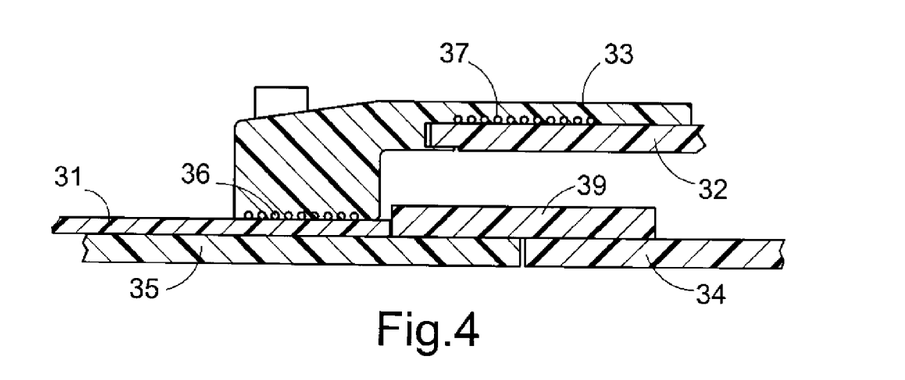
FIG. 4 illustrates a cross sectional view of a first part of the coupling from FIG. 3 coupling a secondary pipe with a secondary elbow or Tee fitting.
Figure 7A:
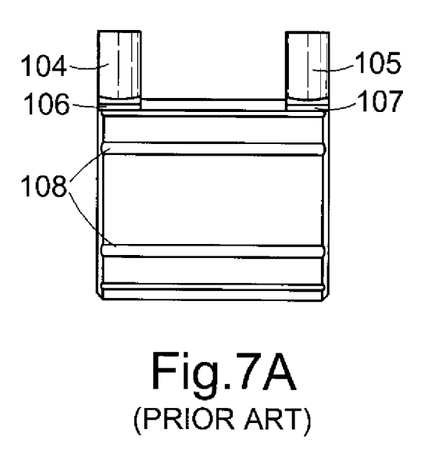
FIG. 7A is a plane view of a first type of low profile coupling which can be used to couple primary pipes together in composite primary/secondary pipe systems.
Figure 7B:
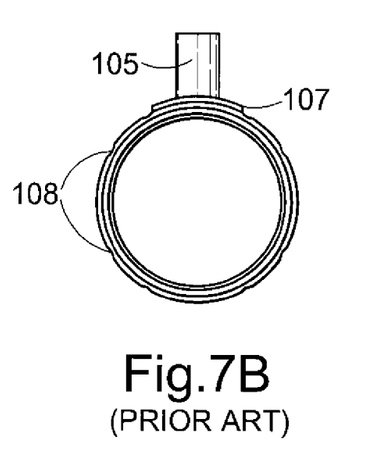
FIG. 7B is an end view of the coupling shown in FIG. 7A.
Figure 7C:
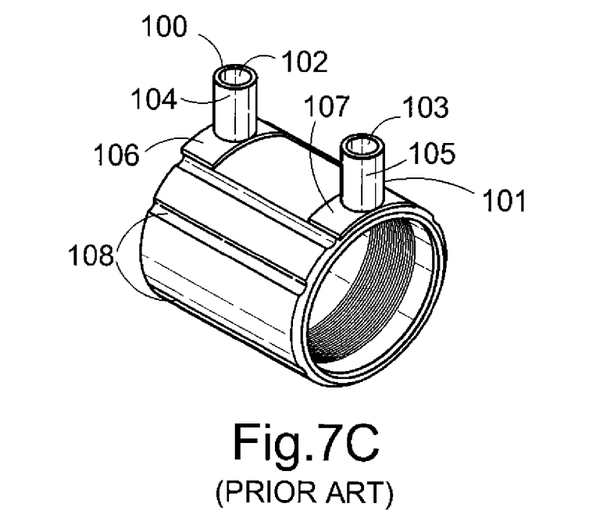
FIG. 7C is a perspective view of the coupling shown in FIG. 7A.
Figure 8A:
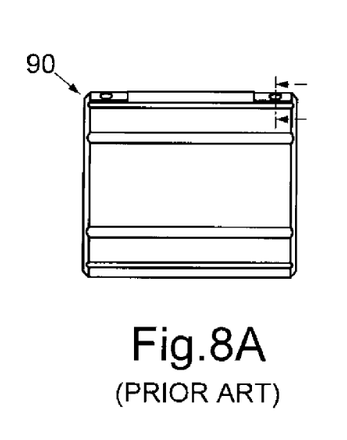
FIG. 8A is a plane view of a second type of low profile coupling which can be used to couple primary pipes together in composite primary/secondary piping systems.
Figure 8B:
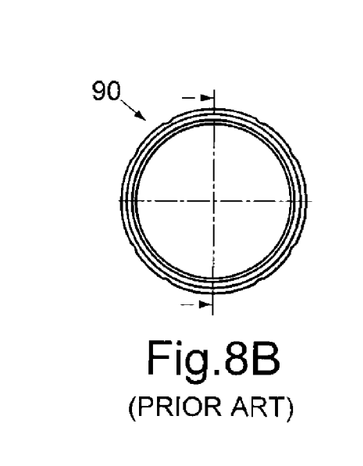
FIG. 8B is an end view of the coupling shown in FIG. 8A.
Figure 8C:
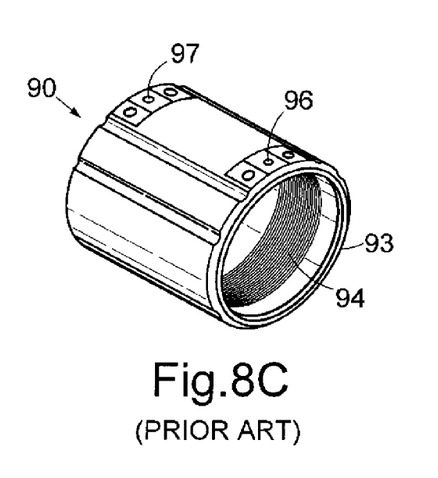
FIG. 8C is a perspective view of the coupling shown in FIG. 8A.
Figure 8D:
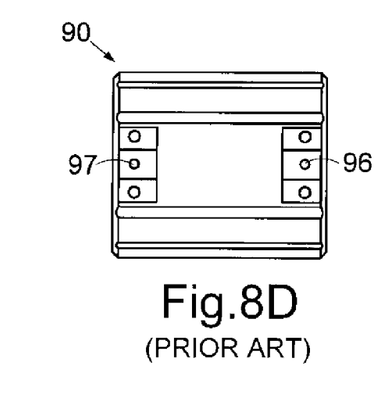
FIG. 8D is a top view of the coupling shown in FIG. 8A.
Figure 8E:
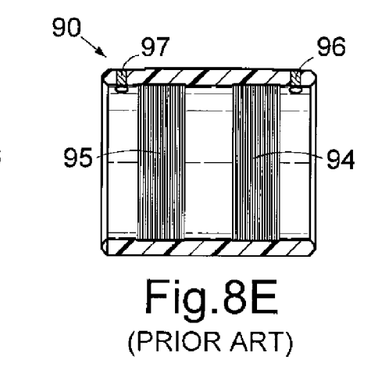
FIG. 8E is a cross sectional view of the coupling shown in FIG. 8A.
Figure 8F:
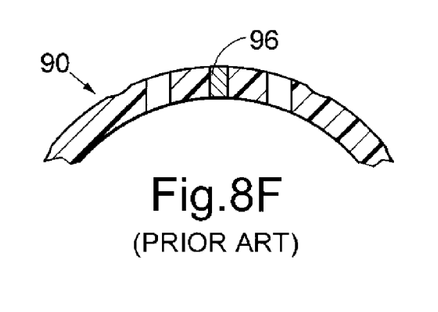
FIG. 8F is a cross sectional view of the coupling shown in FIG. 8E.
Figure 9A:
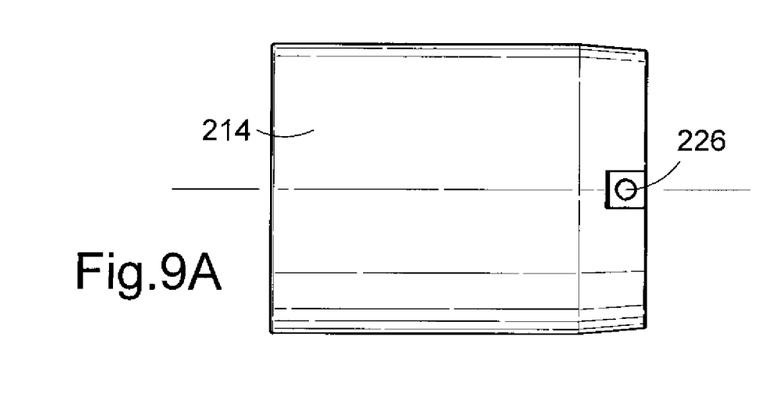
FIG. 9A is a plane view of a first filling part of a coupling according to a further embodiment.
Figure 9B:
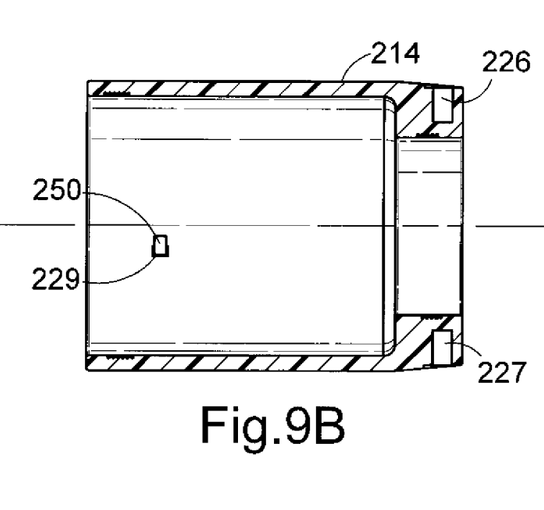
FIG. 9B is a section view of the first fitting part of the coupling shown in FIG. 9A.
Figure 9C:
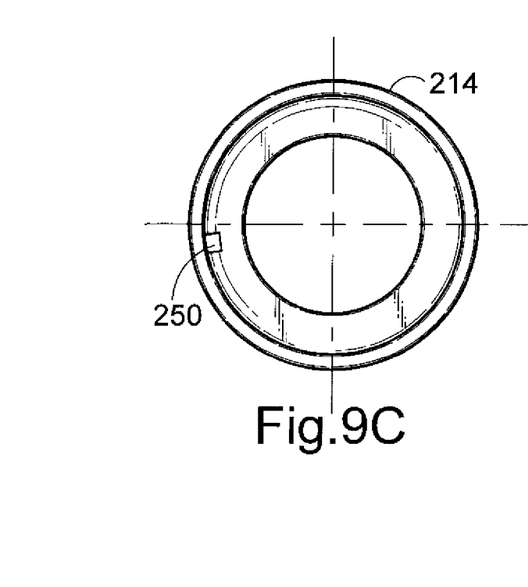
FIG. 9C is a first end view of the first fitting part of the coupling shown in FIG. 11A.
Figure 9D:
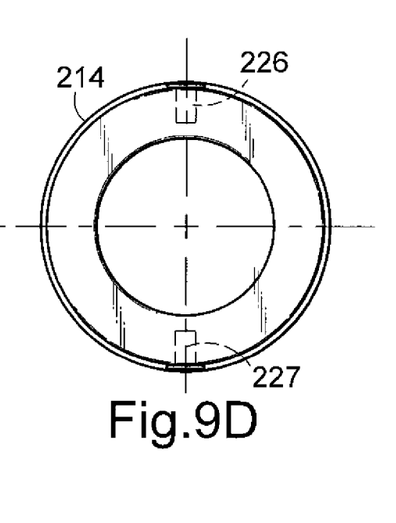
FIG. 9D is a second end view of the first fitting part of the coupling shown in FIG. 9A.

FIGS. 7 and 8 illustrate low profile connectors of the type shown in FIG. 4 as component 39 and of the type described in GB 0022542.5. The entire text of GB 0022542.5 is incorporated herein by reference and is intended to form an integral part of this disclosure.

An example of one such coupling is illustrated in FIGS. 7 and 8. In this example a welding socket 90 comprising a tubular element 93 is formed from plastics material and contains at or near the inner surface two sets of electrical windings 94 and 95. The terminals or contact points 96, 97 at the end of these windings are set within the body of the tube and are preferably flush with the tube surface at that point. These contact points are so arranged that terminal pin assemblies 100, 101 can be fastened over the contacts in a temporary fashion. The fully assembled welding socket is illustrated in FIG. 7. If desired, the two sets of windings can be connected across the welding socket such that only two terminal pins are required, one on each side of the socket.

The terminal pin assemblies comprise terminal pins 102, 103 protected in the normal way by plastic shrouds 104, 105. Each assembly also has a base 106, 107 which substantially follows the contours of the outer surface of the tube. The base acts as a fixing point and a variety of fixing methods are envisaged. Thus, the terminal pin assemblies could be screwed or glued in place or be a sliding fit with the end of the welding socket tube. In a preferred embodiment the two components are ultrasonically welded together at strategic points using a spot welding technique. These welds are strong enough to keep the two components together and the terminal pins in electrical connection with the winding contacts prior to welding but weak enough such that the terminal pin assemblies or terminal means can be removed after the weld is complete and tested. The preferred method of fixing will be determined by the materials specialist and will depend, in part, on the materials used and the application. The inventive feature is considered to be the separate and removable terminal pin assemblies. In practice, where ultrasonic welding is used, the terminal pin assemblies can be knocked off with a hammer blow or prised off with a screwdriver. A shaped entry point (not shown) can be provided to allow a screwdriver blade to be inserted between the temporary terminal means and the body of the coupling. Leverage on the screwdriver causes the two components to separate. The result is a finished coupling with no significant protrusions extending proud of the outer cylindrical surface of the coupling. Once again, it will be appreciated that at the end of the welding operation described above there are no protrusions which stand proud of the generally tubular surface of the welding socket.

The grooves 108 are a deliberate feature and provide passages for both gas/vapour and liquid to pass over the welding socket even when it is assembled within a tight-fitting secondary pipe. This not only aids assembly but also ensures that there is a free passage for any fuel that might leak out into the interstitial space between primary and secondary pipes.

A larger version of the above socket suitable for use with secondary pipes is also described.

Figure 10A:
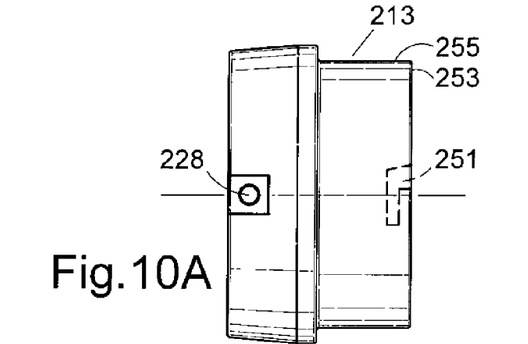
FIG. 10A is a plane view of a second fitting part of the coupling.
Figures 10B, 10C:
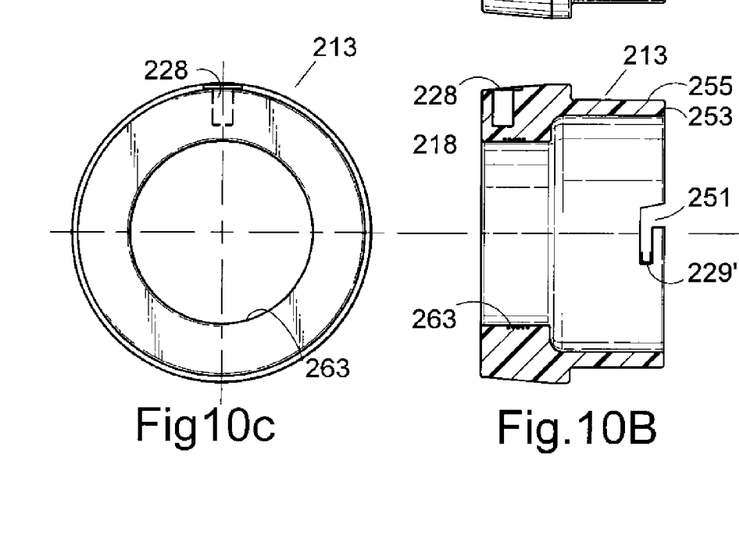
FIG. 10B is a section view of the second fitting part of the coupling shown in FIG. 10A.
FIG. 10C is a first end view of the second filling part of the coupling shown in FIG. 10A.
Figure 10D:
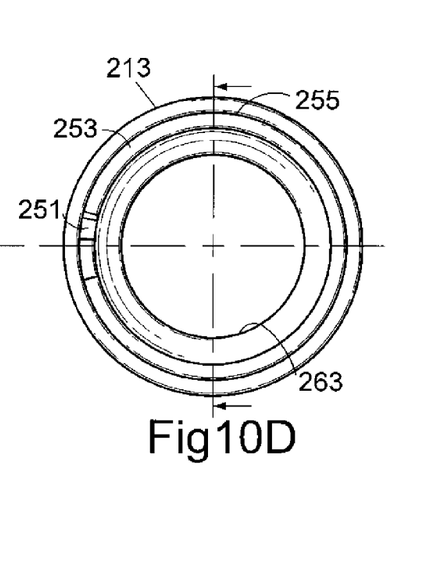
FIG. 10D is a second end view of the second fitting part of the coupling shown in FIG. 10A.

A further preferred embodiment is shown in FIGS. 9 and 10. These illustrate a two part fitting, manufactured in two parts 213 and 214. For clarity the windings are not shown. A similar numbering system to that used in FIGS. 1 to 3 has been used in FIGS. 9 and 10 inclusive. It will be appreciated from the foregoing description that one part of the coupling must contain two sets of electrically heating elements. In theory, it does not matter which part it is. Thus, although in FIG. 3 it shows the central set of windings 17 on the inner surface of part 13, they could equally well have been positioned on the outer surface of part 14 in central region 15.

In the example shown in FIGS. 9 and 10 inclusive, the locking mechanism consists of a lug 250 protruding into the larger diameter opening in part 214. This lug engages in a correspondingly L-shaped groove in part 213. Once the lug is inserted fully into the opening orifice of the "L", the two parts may be turned one with respect to the other such that the two parts cannot be separated by pulling them apart along the longitudinal axis of coupling. Once aligned in this fashion internal contacts form connection 229, 229' between respective heating elements.

The general form of components 213 and 214 is similar to that described in the fitting of FIGS. 1 to 3. Component 213 takes the form of a sleeve which has a first end 253 whose internal diameter is large enough to pass over the coupling used to couple portions of a primary pipe to itself or to an elbow or to a Tee. The outside diameter of this first end 255 is adaptable and designed to be a tight sliding fit with the internal diameter of a first end of component 214.

The second end of component 213 has an internal diameter surface 263 adapted and designed to be a tight sliding fit to the outside diameter of a pipe to be joined. This internal diameter surface 263 also carries electrical windings in its surface (not shown), one end of which is connected to terminal pin 228 and the other end of which is connected to connection 229.

The first end of component 213 incorporates an L-shaped groove 251 cut into the inner surface of diameter 253.

Component 214 takes the form of a sleeve with a first end with an internal diameter 223 which is adapted and designed to be a tight sliding fit over the outside diameter of a secondary pipe. Two terminal pins 226, 227 are provided in this first end.

A second end of component 214 has an internal diameter which is designed and adapted to form a tight sliding fit over the outside diameter of the first end of component 213 and to form a tight sliding fit over the outside diameter of an elbow or Tee fitting. The internal surface of this second end also carries lug 250, adapted to engage in the L-shaped groove 251 described above.

Figure 11:
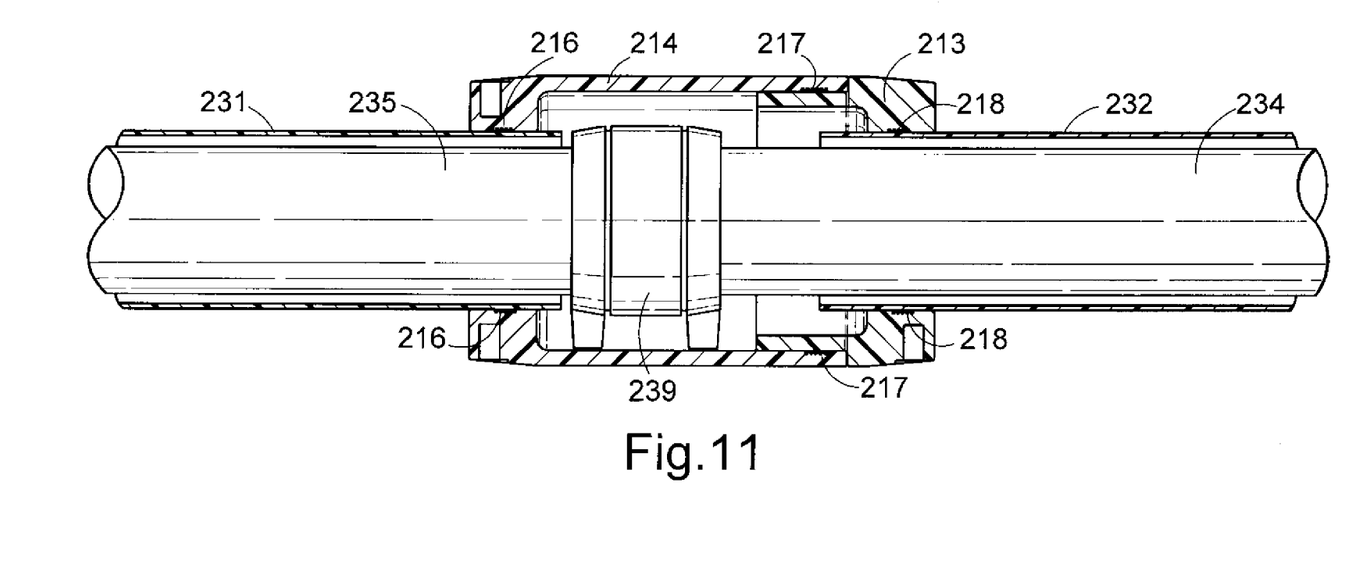
FIG. 11 shows a coupling according to FIG. 9 to 10 in use joining a secondary pipe around a jointed primary pipe.

FIG. 11 illustrates a pipe-to-pipe connection formed using a fitting according to the present invention. Primary pipes 234 and 235 are butted end to end and joined using electrofusion fitting 239. The integrity of this weld can then be tested.

Before making the joint in the primary pipe, fitting components 213 and 214 are slid over the respective ends of secondary pipes 231 and 232. Components 213 and 214 are slid back out of the way so that the joint to the primary pipe can be formed unhindered. Once the joint in the primary pipe has been made and tested fitting components 213 and 214 are pulled together over the joint region of the primary pipe and locked into engagement. Electrical current is then pass through windings 216, 217 and 218 to fuse the fitting components to each other and to both parts of the secondary containment pipe. The joint can then be pressure tested.

FIGS. 12 and 13 illustrate a split coupling according to a further embodiment of the present invention which incorporates a further type of locking mechanism designed to lock the two components together. The general structure of the two components 313 and 314 are as described above.

In this embodiment, the circumferential shoulder 360 in component 313 which forms a mating fit with end diameter face 359 of component 314 incorporates two pins 249 and 250. One of these pins is shown in more detail in FIG. 13E. The pins are firmly embedded in the shoulder surface such that they cannot come loose in normal use. Each pin is substantially identical and comprises a substantially circular cross-sectioned spigot, with a chamfered end, protruding substantially at right angles to the shoulder. The end of each spigot which is embedded in the should is also connected to windings (not shown).

Figure 12A:
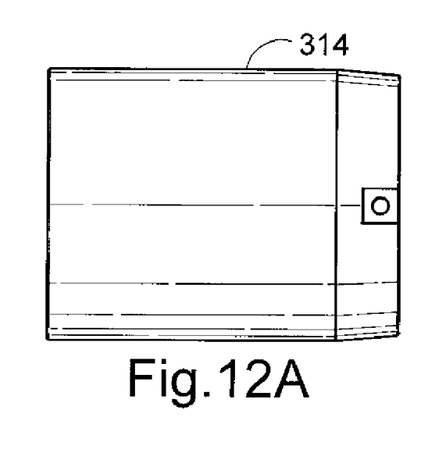
FIG. 12A is a plane view of a fining according to a further embodiment.
Figure 12B:
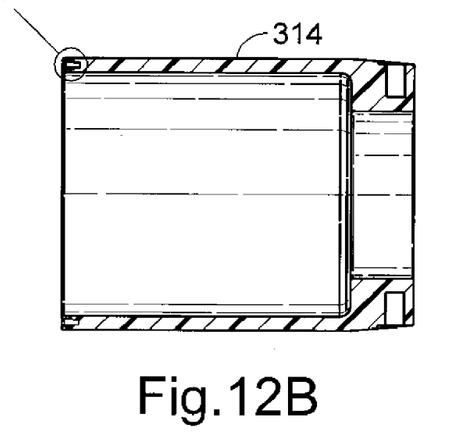
FIG. 12B is a section view of the fitting shown in FIG. 12A.
Figure 12C:
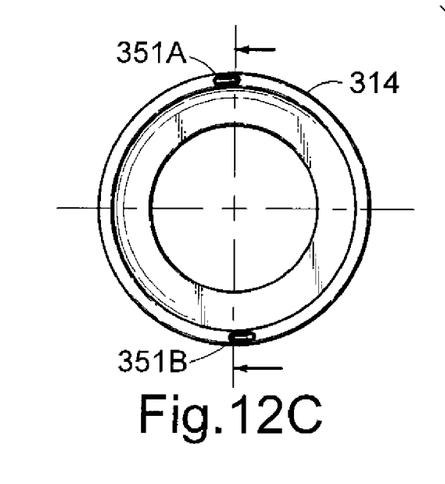
FIG. 12C is a first end view of the fitting shown in FIG. 12B.
Figure 12D:
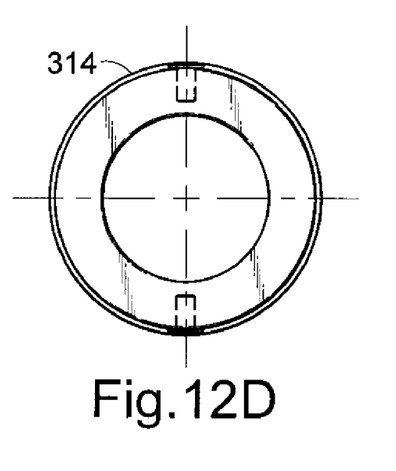
FIG. 12D is a second end view of the fining shown in FIG. 12B.
Figure 12E:
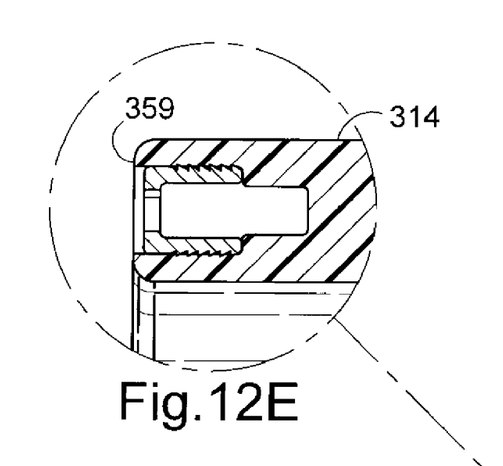
FIG. 12E illustrates and enlargement of a portion of the fining shown in FIG. 12B.
Figure 13A:
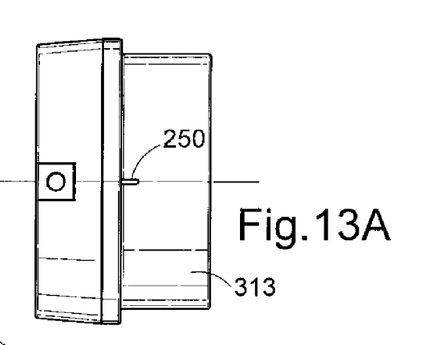
FIG. 13A is a plane view of a second fitting according to a further embodiment.
Figure 13B:
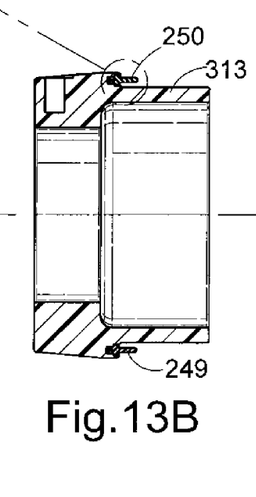
FIG. 13B is a section view of the second filling shown in FIG. 13A'.
Figure 13C:
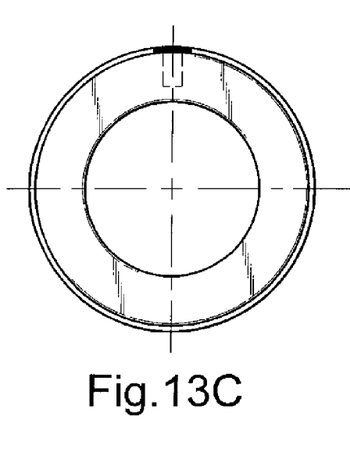
FIG. 13C is a first end view of the second fitting shown in FIG. 13A'.
Figure 13D:
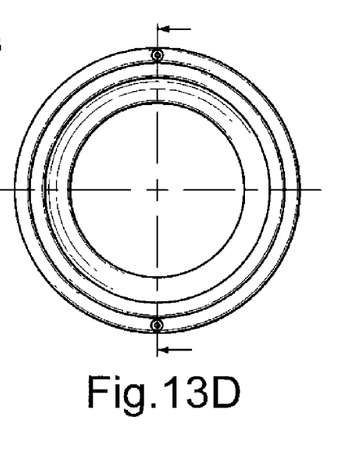
FIG. 13D is a second end view of the second filling shown in FIG. 13A'.
Figure 13E:
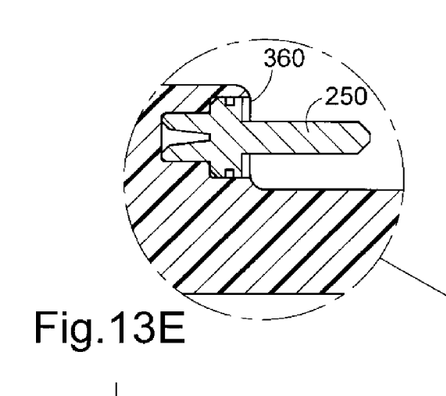
FIG. 13E is an enlargement of a portion of the fining shown in FIG. 13B.

FIG. 12, and in particular FIG. 12E, shows the other component of the locking mechanism. Keyhole shaped apertures 351A and 351B are set into outer end diameter shoulder 359 on fitting part 314. A pin 249, 250 can pass through the substantially circular portion of the keyhole and rotation of the components 313 and 314 with respect to each other forces the pins into the narrow portion of their respective keyhole. This narrower portion is designed to be slightly smaller in cross section than the pin such that the metal of the keyhole cuts into the metal of the pin. This has the dual purpose of ensuring a good electrical connection and preventing the two component parts from separating during the welding process. By arranging for both pins and both keyholes to be connected to their respective windings, this allows for the unlikely event of partial failure in one of the connections.

Couplings according to the present invention can be constructed from any suitable plastics material as determined by the materials specialist. Typically they are formed from a group consisting of:
  Polyethylene
  Polypropylene
  Polyvinyl chloride
However, this group may also include other plastics such as:
  Nylon 612
  Polyamides
  Polyamides 6, 11 or 12
  Polyethylene terephthalate
  Polyvinylidene chloride or fluoride
  Ethylene/vinyl alcohol copolymers
or mixtures of any of the above.

From the above description it will be appreciated that the present invention provides an electrofusion coupling formed in two parts, both parts containing at least one electrofusion heating element and at least one electrical connection terminal, a first part being adapted for independent use to join a pipe to a pipe fitting, and the first and second parts being adapted to mate together in a nested configuration for use in combination to join two sections of pipe and, at the same time, to join themselves together.

The electrofusion heating element in the first part is connected at opposing ends to two terminal connecting pins, enabling current to pass through the electrofusion windings without the need to involve the second part. The first part also incorporates a connection means adapted to provide, in use, an electrical connection between the electrofusion heating element in the first part and the electrofusion heating element in the second part through a corresponding connection means in the second part. Once connected in this fashion electrical current can flow through both sets of electrical windings simultaneously causing the first and second parts to fuse together and the first part and the second part to fuse to adjacent sections of pipe.

Component 14 could be modified to replace the connection means 229/229' by a second terminal pin D, not shown, in that component. In this modification both component 13 and component 14, and their equivalents in other embodiments, can be used in isolation or in combination to join pipework components.

Couplings according to the present invention can be used on a variety of pipes and pipe fittings of varying sizes, shapes and cross-sections. They can also be used with both primary and secondary pipes.

The invention claimed is:

1. An electrofusion coupling for joining together two or more sections of pipe or for joining a section of pipe and a pipework fitting, said coupling comprising:
  a first part having a first internal diameter at a first body portion that forms a sliding fit with a first pipe section and a second internal diameter at a second body portion, the second internal diameter at the second body portion of the first part being larger than the first internal diameter at the first body portion of the first part, the first part further comprising:
- a first part electrical heating element having a first heating portion disposed at the first body portion of the first part and a second heating portion disposed at the second body portion of the first part;
- a first electrical terminal connection in electrical communication with the first heating portion of the first part electrical heating element;
- a second electrical terminal connection in electrical communication with the second heating portion of the first part electrical heating element; and
- a third electrical terminal connection internally disposed at the second body portion of the first part and in electrical communication with the second heating portion of the first part electrical heating element;

a second part having a first internal diameter at a first body portion that forms a sliding fit with a second pipe section and an outside diameter at a second body portion that forms a sliding fit with the second internal diameter of the second body portion of the first part such that the two parts can nest together with an overlapping region, the second part further comprising:
- a second part electrical heating element disposed at the first body portion of the second part;
- a fourth electrical terminal connection in electrical communication with the second part electrical heating element;
- a fifth electrical terminal connection in electrical communication with the second part electrical heating element, the second electrical terminal connection of the second part being alignable to, and in electrical communication with, the third electrical terminal connection of the first part when the second body portion of the second part overlaps the second body portion of the first part in a nested configuration;

wherein the first part can be used independently of the second part to join a section of pipe to a pipe or pipework fitting or the first and second parts can be used in combination to join two adjacent sections of pipe.

2. An electrofusion coupling as claimed in claim 1, wherein the first heating portion of the first part electrical heating element is located at or near the surface of the first internal diameter and the second heating portion of the first part electrical heating element is located at or near the surface of the second internal diameter.

3. An electrofusion coupling as claimed in claim 2 wherein the first heating portion of the first part electrical heating element is electrically connected to the second heating portion of the first part electrical heating element in series.

4. An electrofusion coupling as claimed in claim 1, wherein the second part electrical heating element is located at or near an internal surface of the second part.

5. An electrofusion coupling as claimed in claim 1, wherein the second internal diameter of the first part has a sliding fit over a pipe connector.

6. An electrofusion coupling as claimed in claim 1 further comprising a locking mechanism that locks the first and second parts together in the nested configuration and maintains electrical communication between the first part electrical heating element and the second part electrical heating element when the first and second parts are locked together.

7. An electrofusion coupling as claimed in claim 6, wherein the locking mechanism comprises a spigot pin on one part of the coupling which engages an orifice in the other part of the fitting.

8. An electrofusion coupling as claimed in claim 1, wherein the second internal diameter of the first part is a sliding fit over a third pipe section.

9. An electrofusion coupling for joining together two or more sections of pipe or for joining a section of pipe and a pipework fitting, said coupling comprising:
- a first part at a first body portion that forms a sliding fit with a first pipe, the first part having a first part electrical heating element, a first electrical terminal connection, a second electrical terminal connection and a third electrical terminal connection, the first, second and third electrical terminal connections in electrical communication with the first part electrical heating element, the third electrical terminal connection disposed internally of the first part;
- a second part at a first body portion that forms a sliding fit with a second pipe and at a second body portion that forms a sliding fit with the second body portion of the first part of the coupling such that the two parts can overlap in a nested configuration, the second part having a second part electrical heating element, a fourth electrical terminal connection and a fifth electrical terminal connection, the second electrical terminal connection of the second part being alignable to the third electrical terminal connection of the first part;
- a locking mechanism to lock the first and second parts together in the nested configuration;
- wherein the first part can be used independently of the second part to join a section of pipe to a pipe or pipework fitting or the first and second parts can be used in combination to join two adjacent sections of pipe;
- wherein electrical contact between the third electrical terminal connection of the first part electrical heating element and the fifth electrical terminal connection of the second part is establishable when the first and second parts are in the nested configuration.

10. An electrofusion coupling for joining together two or more sections of pipe or for joining a section of pipe and a pipework fitting, said coupling comprising:
(i) a first part having a first internal diameter at a first end that forms a sliding fit with a first pipe section and a second internal diameter at a second end, the second internal diameter at the second end of the first part being larger than the first internal diameter at the first end of the first part;
(ii) a second part having a first internal diameter at a first end that forms a sliding fit with a second pipe section and an outside diameter at a second end adapted to form a sliding fit with the second internal diameter of the first part such that the two pads can nest together with an overlapping region;
(iii) a first part electrical heating element with a first terminal connection incorporated into the first part;
(iv) a second part electrical heating element incorporated into the second part;
wherein the first terminal connection forms, in use, an electrical connection between the first part electrical heating element and the second part electrical heating element such that the first part can be used independently of the second part to join a section of pipe to a pipe or pipework fitting or the first and second parts can be used in combination to join two adjacent sections of pipe,
wherein a locking mechanism is provided, the locking mechanism locks the two parts together in the nested configuration, which locking mechanism comprises a pin on one part of the coupling that engages an orifice in the other part of the coupling, the electrical connection between the first part electrical heating element and the second part electrical heating element is established when the two parts are nested and locked together.

11. An electrofusion coupling as claimed in claim 10, wherein the first part electrical heating element comprises first and second heating portions, the first heating portion being located at or near the surface of the first internal diameter and the second heating portion being located at or near the surface of the second internal diameter, the first or second heating portions being connected to the first terminal connection provided in the first part.

12. An electrofusion coupling as claimed in claim 11 wherein the first electrical heating element is electrically connected to the second electrical heating element in series.

13. An electrofusion coupling as claimed in claim 10, wherein the second part electrical heating element is located at or near the first internal diameter of the second part, a first end portion of the second part electrical heating element being connected to a second electrical terminal connection and the other end portion of the second part electrical heating element part being connected to a third terminal connection that forms, in use, an electrical connection between the first part electrical heating element and the second part electrical heating element.

14. An electrofusion coupling as claimed in claim 10, wherein the second internal diameter of the first part is a sliding fit over a pipe connector.

15. An electrofusion coupling as claimed in claim 10, wherein the coupling incorporates at least three electrical terminal connections, at least two connected to the first part electrical heating element and at least one connected to second part electrical heating element.

16. An electrofusion coupling as claimed in claim 10, wherein the second internal diameter of the first part is a sliding fit over a third pipe section.

\* \* \* \* \*